(12) United States Patent
Chen et al.

(10) Patent No.: US 11,029,144 B2
(45) Date of Patent: Jun. 8, 2021

(54) SUPER-RAPID THREE-DIMENSIONAL TOPOGRAPHY MEASUREMENT METHOD AND SYSTEM BASED ON IMPROVED FOURIER TRANSFORM CONTOUR TECHNIQUE

(71) Applicant: NANJING UNIVERSITY OF SCIENCE AND TECHNOLOGY, Jiangsu (CN)

(72) Inventors: Qian Chen, Nanjing (CN); Chao Zuo, Nanjing (CN); Shijie Feng, Nanjing (CN); Jiasong Sun, Nanjing (CN); Yuzhen Zhang, Nanjing (CN); Guohua Gu, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 66 days.

(21) Appl. No.: 16/496,815

(22) PCT Filed: Feb. 26, 2018

(86) PCT No.: PCT/CN2018/077216
§ 371 (c)(1),
(2) Date: Sep. 23, 2019

(87) PCT Pub. No.: WO2018/171385
PCT Pub. Date: Sep. 27, 2018

(65) Prior Publication Data
US 2021/0102801 A1    Apr. 8, 2021

(30) Foreign Application Priority Data
Mar. 24, 2017    (CN) .......................... 201710182456.8

(51) Int. Cl.
*G01B 11/25*    (2006.01)

(52) U.S. Cl.
CPC ........ *G01B 11/2504* (2013.01); *G01B 11/254* (2013.01)

(58) Field of Classification Search
None
See application file for complete search history.

(56) References Cited

U.S. PATENT DOCUMENTS

| 7,703,069 | B1 | 4/2010 | Liu et al. |
| 2005/0280831 | A1 | 12/2005 | Fujiwara et al. |
| | | (Continued) | |

FOREIGN PATENT DOCUMENTS

| CN | 101451826 A | 6/2009 |
| CN | 101936718 A | 1/2011 |
| | (Continued) | |

OTHER PUBLICATIONS

International Search Report for PCT/CN2018/077216 dated May 2, 2018.

(Continued)

*Primary Examiner* — Michael P LaPage
(74) *Attorney, Agent, or Firm* — Birch, Stewart, Kolasch & Birch LLP

(57) ABSTRACT

A super-rapid three-dimensional measurement method and system based on an improved Fourier transform contour technique is disclosed. The method comprises: firstly calibrating a measurement system to obtain calibration parameters, then cyclically projecting 2n patterns into a measured scene using a projector, wherein n patterns are binary sinusoidal fringes with different high frequency, and the other n patterns are all-white images with the values of 1, and projecting the all-white images between every two binary high-frequency sinusoidal fringes, and synchronously acquiring images using a camera; and then performing phase unwrapping on wrapped phases to obtain initial (Continued)

absolute phases, and correcting the initial absolute phases, and finally reconstructing a three-dimensional topography of the measured scene by exploiting the corrected absolute phases and the calibration parameters to obtain 3D spatial coordinates of the measured scene in a world coordinate system, thereby accomplishing three-dimensional topography measurement of an object. In this way, the precision of three-dimensional topography measurement is ensured, and the speed of three-dimensional topography measurement is improved.

10 Claims, 3 Drawing Sheets

(56) References Cited

U.S. PATENT DOCUMENTS

| | | | | |
|---|---|---|---|---|
| 2013/0343629 | A1* | 12/2013 | Myers | G06T 11/006 382/131 |
| 2015/0176982 | A1* | 6/2015 | Gupta | G01B 11/254 348/136 |
| 2017/0287157 | A1* | 10/2017 | Seto | G06T 7/60 |
| 2018/0227571 | A1* | 8/2018 | Page | G01B 11/2513 |
| 2019/0271540 | A1* | 9/2019 | Da | G01B 11/2504 |

FOREIGN PATENT DOCUMENTS

| | | |
|---|---|---|
| CN | 101975558 A | 2/2011 |
| CN | 103994732 A | 8/2014 |
| CN | 104315996 A | 1/2015 |
| CN | 107044833 A | 8/2017 |
| JP | 2005-91325 A | 4/2005 |

OTHER PUBLICATIONS

Wu et al., "Composite Fourier transform profilometry based on flat image modulation", High Power Laser and Particle Beams, Jan. 30, 2013, vol. 25, No. 1, total 6 pages.

Zuo et al., "Micro Fourier Transform Profilometry (μFTP): 3D shape measurement at 10,000 frames per second", Optics and Lasers in Engineering, Nov. 6, 2017, vol. 102, ISSN :0143-8166, pp. 70-91.

* cited by examiner

SUPER-RAPID THREE-DIMENSIONAL TOPOGRAPHY MEASUREMENT METHOD AND SYSTEM BASED ON IMPROVED FOURIER TRANSFORM CONTOUR TECHNIQUE

FIELD OF THE INVENTION

The invention belongs to the field of three-dimensional imaging technology, in particular to a super-rapid three-dimensional topography measurement method and system based on an improved Fourier transform contour technique.

BACKGROUND OF THE INVENTION

In the past few decades, benefited from the rapid development of electronic imaging sensors, optoelectronic technology and computer vision, 3D image acquisition technology has become more and more mature. However, in areas such as biomechanical analysis, industrial testing, solid mechanics deformation analysis, and vehicle impact testing, it is desirable to be able to obtain three-dimensional topographical information during transient change of an object and then play it back at a slower speed for observation and analysis. Fringe projection contour technique is a widely used method to obtain three-dimensional topographical information of objects, which has the advantages of non-contact, high resolution and strong practicability. Fringe projection contour technique is generally divided into two categories: Fourier transform contour technique and phase-shifting contour technique. Fourier transform contour technique (Fan Yujia's master thesis: the three-dimensional topography of objects using Fourier transform contour technique, 2011) only needs one fringe to obtain the three-dimensional information of an object and the measurement speed is fast, but due to the existence of spectrum overlapping and other problems, the measurement accuracy is lower than that of phase-shifting contour technique. Although phase-shifting contour technique has high precision, at least three fringe patterns are required to obtain the three-dimensional information of an object, thus limiting its measurement speed. The measurement speed of the currently implemented three-dimensional topography measurement technology cannot meet the needs of a super-rapid three-dimensional topography measurement field.

At the same time, for the hardware technical indicators required for the super-rapid three-dimensional measurement of the fringe projection contour technique, on the one hand, the existing high-speed camera can achieve the speed of 10,000 frames per second for the acquisition of two-dimensional images. The acquisition speed can be faster by reducing the resolution of the captured image. On the other hand, the digital micro-mirror device (DMD) is the main component of a projector, and the rate at which the binary pattern is projected by the optical switch can also reach 10000 Hz. Therefore, hardware is no longer a limiting factor in the measurement speed of fringe projection contour technique. How to reduce the number of fringe images required while ensuring measurement precision is the key to solve the problem. Although traditional Fourier transform contour technique only needs one fringe and has fast measurement speed, once a measured object has the problems like sharp edges, surface discontinuities and surface reflectance changes, the spectrum overlapping will be caused, which will lead to low measurement precision. Researchers have proposed the $\pi$ phase-shifting Fourier transform contour technique (Guo L, Su X, Li J. "Improved Fourier transform contour technique for the automatic measurement of 3D object shapes". Optical Engineering, 1990, 29(12): 1439-1444.) and Fourier transform contour technique technique of subtracting background (Guo H, Huang P. "3D shape measurement by use of a modified Fourier transform method". Proc. SPIE. 2008,7066:70660E.), but the former included height information in two sinusoidal fringe patterns, resulting in increased sensitivity to motion, which does not suit to high-speed three-dimensional measurements. The fringe patterns required for the later cannot be accurately produced under a binary pattern projection mode. Once the binary pattern projection mode cannot be used, the measurement speed will be greatly reduced. At the same time, these two improved methods cannot solve the spectrum overlapping problem caused by the large change of surface reflectivity of the measured object. However, for the phase-shifting contour technique, although the measurement precision is high, a lot of fringe patterns are required, which affects the measurement speed. Some researchers have proposed some improved methods, for example, some people propose to use dual-frequency fringe pattern composites method (Liu K, Wang Y, Lau D L. "Dual-frequency pattern scheme for high-speed 3-D shape measurement" Optics express, 2010, 18(5): 5229-5244.). A method of embedding speckle in a fringe pattern has also been proposed (Zhang Y, Xiong Z, Wu F. "Unambiguous 3D measurement from speckle-embedded fringe". Applied optics, 2013, 52(32): 7797-7805.). However, the improved methods still limit the measurement speed of three-dimensional topography of an object to less than 1000 Hz, which cannot meet requirements for three-dimensional topography measurement of super-rapid speed scenes such as bullet leaving a gun and balloon explosions. It can be seen that there is currently no three-dimensional topography measurement method that can achieve ultra-high speed, that is, tens of thousands of frames per second, while ensuring the measurement precision.

SUMMARY OF THE INVENTION

The object of the present invention is to provide a super-rapid three-dimensional measurement method and system based on an improved Fourier transform contour technique, which can significantly improve measurement speed of three-dimensional topography measurement of an object while ensuring the precision of three-dimensional topography measurement of the object.

A technical solution for achieving the object of the present invention is: a super-rapid three-dimensional topography measurement method and system based on an improved Fourier transform contour technique including the steps of firstly calibrating a measurement system to obtain calibration parameters, the measurement system being composed of a projector, a camera and a computer; then cyclically projecting n (n≥2) patterns and m (m=n) all white images onto a measured scene using the projector, wherein the n patterns are different binary high-frequency sinusoidal fringes, and the m all-white images are with the values of 1; projecting the m all-white images between every two binary high-frequency sinusoidal fringes, and synchronously acquiring n+m images using the camera; then using a background normalized Fourier transform contour technique method to obtain a wrapped phase; using temporal phase unwrapping with projection distance minimization (PDM) method to obtain initial absolute phases; using a reliability guided compensation (RGC) of fringe order error method to correct the initial absolute phase; and finally, reconstructing a three-dimensional topography of the measured scene with the corrected absolute phases and the calibration parameters to obtain 3D spacial coordinates of the measured scene in a world coordinate system, thereby accomplishing three-dimensional topography measurement of the object.

Compared with the prior art, the present invention has significant advantages: (1) the background normalized Fourier transform contour technique uses a fringe pattern to contain three-dimensional information of a current-moment motion scene, and uses all-white images to remove zero frequency in the spectrum to eliminate the influence of spectrum overlapping caused by sharp edges, surface discontinuity and large changes in surface reflectivity of the measured object while ensuring the measurement precision; (2) using temporal phase unwrapping with projection distance minimization (PDM) method to unwrap the wrapping phase in the case of a separate object in a measured scene, and high-frequency sinusoidal fringes ensure the precision of the measurement, so that the height information contained in each sinusoidal fringe can be used to ensure the measurement speed; (3) the absolute phase obtained by the temporal phase unwrapping with projection distance minimization (PDM) is further corrected by the reliability guided compensation (RGC) of fringe order error method and some error points that may exist due to the motion influence are also corrected, which further ensures the measurement precision; and (4) in the experiment, a three-dimensional topography measurement system is built by using a projector with a binary pattern projection speed a camera with an image acquisition speed of 20000 Hz, and a computer. The reconstruction rate of absolute three-dimensional topography at 10000 frames per second is realized by the method of the invention. In the measurement range of 400 mm×275 mm×400 mm, the depth precision is 80 μm, and the time domain error is less than 75 μm. Not only can three-dimensional topography measurement be realized for the general static and dynamic measurement scenes, but also it can be realized for super-fast scenes like bullet leaving a gun and balloon explosions.

The invention is further described in detail below with reference to the accompanying drawings.

DESCRIPTION OF THE PREFERRED EMBODIMENT

Figure 1:
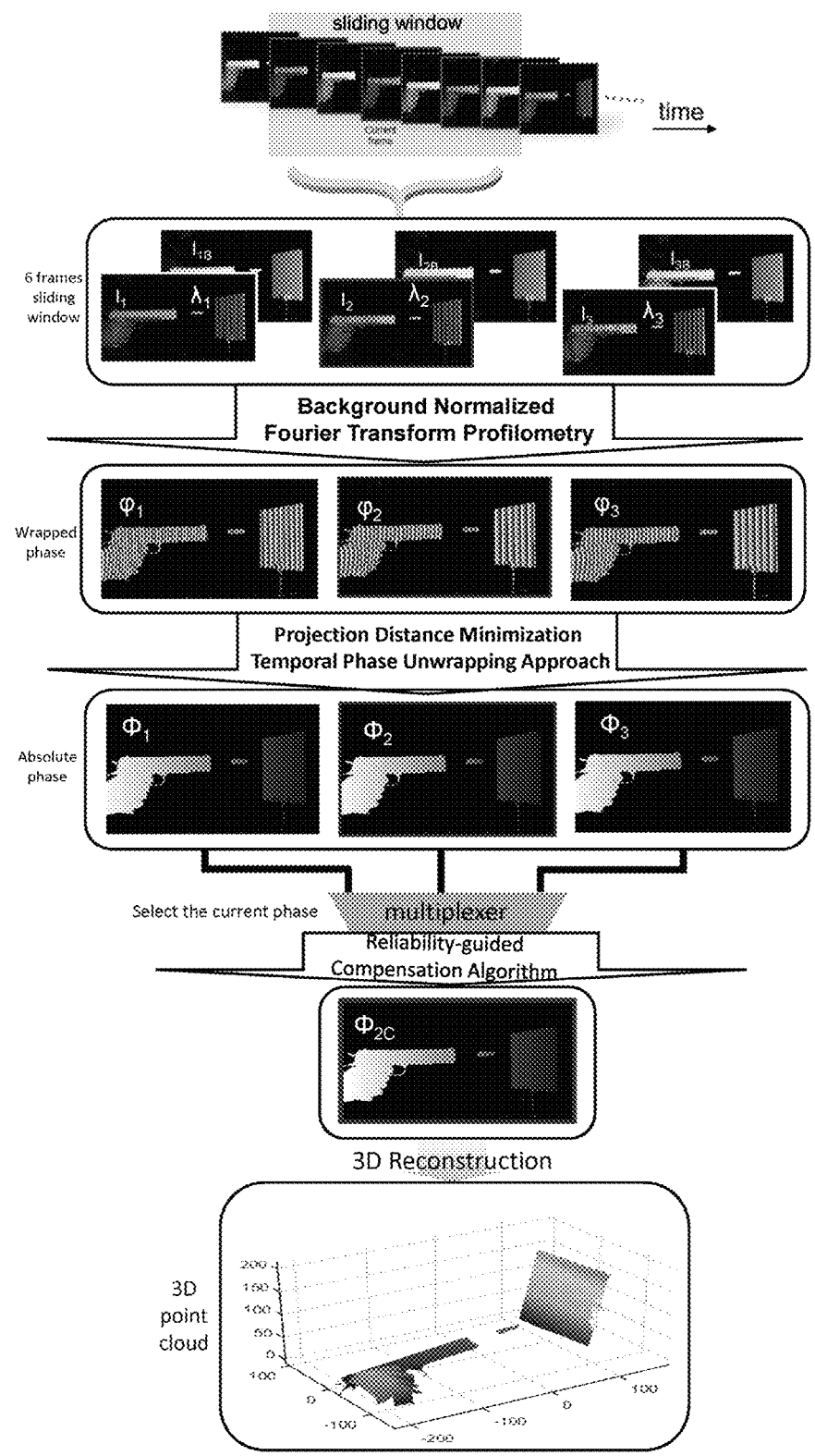
FIG. 1 is the flow chart of the measurement method of present invention.
Figure 5:
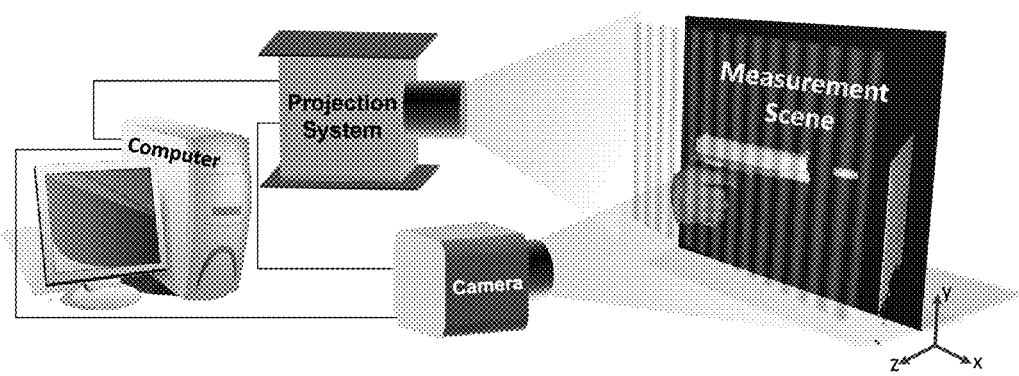
FIG. 5 is the schematic map of the measurement subsystem of the present invention.

Referring to FIG. 1 and FIG. 5, the present invention is based on a super-rapid three-dimensional topography measurement method and system based on an improved Fourier transform contour technique, including the steps of firstly calibrating a measurement system to obtain calibration parameters, the measurement system being composed of a projector, a camera and a computer; then cyclically projecting n (n≥2) patterns and m (m=n) all white images onto a measured scene using the projector, wherein n patterns are binary sinusoidal fringes with different high frequencies, and the m all-white images are with values of 1; projecting the m all-white images between every two binary high-frequency sinusoidal fringes, and synchronously acquiring n+m images using the camera; then using the background normalized Fourier transform contour technique method to obtain the wrapped phase; using temporal phase unwrapping with projection distance minimization (PDM) method to obtain initial absolute phases; using a reliability guided compensation (RGC) of fringe order error method to correct the initial absolute phase; and finally reconstructing a three-dimensional topography of the measured scene with the corrected absolute phases and the calibration parameters to obtain 3D spacial coordinates of the measured scene in a world coordinate system, thereby accomplishing three-dimensional topography measurement of an object. The specific implementation steps of the above method are as follows.

The first step is to build a measurement subsystem. The measurement subsystem comprises a projector, a camera and a computer, where the computer and the projector and the camera are respectively connected to signal lines, and the projector and the camera are connected to each other by trigger lines. There are no strict requirements for the placement of the projector and the camera, as long as scenes that are projected and captured contain the scene to be measured. The computer is equipped with software for controlling the projector and camera, and the software can set parameters of the projector and camera and control the process of the projection of the projector and image acquisition of the camera. MATLAB is also installed in the computer. After images are captured, the process of processing images is realized by MATLAB codes. Using camera calibration method proposed by Zhengyou Zhang (Z. Zhang. "A flexible new technique for camera calibration." IEEE Transactions on pattern analysis and machine intelligence. 22(11), 1330-1334 (2000).) and the method proposed by Zhang S for the calibration method of structured light 3D measurement system (Zhang S, Huang P S. "Novel method for structured light system calibration". Optical Engineering, 2006, 45(8): 083601-083601-8.) to calibrate the camera and the projector to obtain calibration parameters, including internal and external parameters of the camera and the projector.

The second step is to project and acquire images. The specific processing process of projecting and acquiring images is as follows: the projector cyclically projecting n (n≥2) patterns and m (m=n) all-white images onto a measured scene using the projector, wherein n patterns are different binary high-frequency sinusoidal fringes, and the m all-white images are with values of 1; and projecting the m all-white images between every two binary high-frequency sinusoidal fringes, and synchronously acquiring m+n images using the camera. The wavelengths of the n high-frequency sinusoidal fringes emitted by the projector must be different, and the wavelengths are marked as $\{\lambda_1, \lambda_2, \ldots, \lambda_n\}$. Two conditions must be satisfied when designing the wavelengths: ① the wavelength of the sinusoidal fringes is sufficiently small (for example a fringe pattern with at least 50 fringes) and ensures that the phase can be successfully retrieved using conventional Fourier transform contour technique; ② the least common multiple of the set of wavelength is greater than or equal to the resolution of the projector along the sinusoidal intensity value, denoted as W. The horizontal resolution of the projector is W, and the projected fringes are vertical fringes (the fringe intensity varies along the lateral direction of the projector). Then the least common multiple between the wavelengths of the sinusoidal fringes needs to be greater than or equal to W, that is, the following formula is satisfied:

$$\text{LCM}(\lambda_1, \lambda_2, \ldots, \lambda_n) \geq W \quad (1),$$

where LCM represents the least common multiple operation and the generated high-frequency sinusoidal fringes are represented by the following formula in the projector space:

$$I^p(x^p, y^p) = a^p + b^p \cos(2\pi f_0^p x^p) \quad (2),$$

where the superscript p is the initial letter of projector and represents the projector space, $I^p$ represents the intensity of the fringe, $(x^p, y^p)$ is the pixel coordinates of the projector, $a^p$ is the average intensity of the sinusoidal fringe, $b^p$ is the amplitude of the sinusoidal fringe, and $f_0^p$ is the frequency of the sinusoidal fringes. The halftone technique (Floyd R W. "An adaptive algorithm for spatial gray-scale". Proc Soc Inf Disp; 1976.) is then used to convert the high-frequency sinusoidal fringes into binary high-frequency sinusoidal fringes, so that the projection speed of the projector can reach the maximum of the inherent projection speed of the projector, ensuring that the hardware does not affect the measurement speed. When the fringe pattern is a binary pattern, both $a^p$ and $b^p$ in equation (2) are ½, and equation (2) is written as:

$$I_1^p(x^p, y^p) = \tfrac{1}{2} + \tfrac{1}{2} \cos(2\pi f_0^p x^p) \quad (3),$$

where $I_1^p$ represents the intensity of the first high-frequency sinusoidal fringe pattern, the all-white images projected between every two binary high-frequency sinusoidal fringes mean that the values of all the pixels on the projected image are "1", that is, all micro-mirrors on the digital micro-mirror device DMD—the core components of the projector—are the "on" state and are represented by the following formula:

$$I_2^p(x^p, y^p) = 1 \quad (4),$$

where $I_2^p$ represents the intensity of the all-white images, $(x^p, y^p)$ represents the pixel coordinates of the projector, and the expression of the remaining high frequency sinusoidal fringes is the same as formula (3), except that the frequency $f_0^p$ is different according to the different wavelength. The n+m images are cyclically projected onto the measured scene using the projector, and the camera synchronously acquires the images according to the trigger signal of the projector.

The third step is to obtain the wrapped phase by using a background normalized Fourier transform contour technique method. The specific process of the third step is as follows: in the background normalized Fourier transform contour technique module, after the acquisition of images captured by the camera, every two images are sequentially processed, where the two images include a high-frequency sinusoidal fringe image and a corresponding all-white image. The high-frequency sinusoidal fringe image and the all-white image captured by the camera are respectively expressed by the following formulas:

$$I_1(x^c, y^c) = \tfrac{1}{2}\alpha(x^c, y^c) + \tfrac{1}{2}\alpha(x^c, y^c)\cos[2\pi f_0 x^c + \phi(x^c, y^c)] \quad (5); \text{ and}$$

$$I_2(x^c, y^c) = \alpha(x^c, y^c) \quad (6),$$

where the superscript c is the initial letter of "camera" and represents a camera space, $I_1$ is an image captured by the camera after the high-frequency sinusoidal fringe pattern is projected onto the measured scene, $I_2$ is an image captured by the camera after the all-white image is projected onto the measured scene, $(x^c, y^c)$ is pixel coordinates of the camera, $\alpha(x^c, y^c)$ is the reflectivity of the measured object, $f_0$ is the sinusoidal fringe frequency, $\phi(x^c, y^c)$ is the phase containing the depth information of the object, $\tfrac{1}{2}\alpha(x^c, y^c)$ is the zero-frequency part after Fourier transform and its existence will cause spectrum overlapping problem. By using $I^1$ and $I_2$ in equations (5) and (6), the influence of the zero-frequency part and the surface reflectivity $\alpha(x^c, y^c)$ of the object to be measured can be removed before performing Fourier transform, see equation (7):

$$I_d(x^c, y^c) = \frac{2I_1 - I_2}{I_2 + \gamma} = \cos[2\pi f_0 x^c + \phi(x^c, y^c)], \quad (7)$$

where γ is a constant (such as 0.01) mainly for the purpose of preventing the occurrence of zero as a divisor. Then Fourier transform is carried out on the $I_d$ after background normalization, and the filter (such as Hanning window) is used to extract the valid information, and then the Fourier inverse transform is performed on the selected spectrum to obtain the wrapped phase. Therefore, using all-white images to remove the influence of the zero-frequency ($\tfrac{1}{2}\alpha(x^c, y^c)$) and the reflectivity ($\alpha(x^c, y^c)$) on the surface of the measured object before Fourier transform effectively solves the problem of spectrum overlapping. Through this procedure, the wrapped phase corresponding to each high-frequency sinusoidal fringe acquired by the camera is obtained and contains the depth information of scenes corresponding to each moment when the camera captures the high-frequency sinusoidal fringe pattern.

The fourth step is to obtain the initial absolute phase by using a temporal phase unwrapping with projection distance minimization (PDM) method. The specific process is as follows: after obtaining the phase corresponding to the high-frequency sinusoidal fringe image acquired by the camera through the third step, since its range is wrapped in $(-\pi, \pi]$, the phase is called the wrapped phase as there is ambiguity.

Therefore, it needs to be unwrapped to get the absolute phase, using the wrapped phases corresponding to a set of high-frequency sinusoidal fringes to unwrap each of wrapped phases. The high-frequency sinusoidal fringes projected by the projector in the second step are different in wavelength and are recorded as a wavelength vector $\lambda = [\lambda_1, \lambda_2, \ldots, \lambda_n]^T$, and the wrapped phase vector corresponding to each high-frequency sinusoidal fringe obtained by Fourier transform contour technique method in the second step is marked as $\varphi = [\phi_1, \phi_2, \ldots, \phi_n]^T$. Because the resolution of the projector along the direction of the sinusoidal fringe intensity is limited, the possible fringe order combinations are also limited. The fringe order combinations are listed one by one (Petković T, Pribanić T, Đonlić M. "Temporal phase unwrapping using orthographic projection". Optics &Lasers in Engineering, 2017, 90: 34-47.), and each set of fringe order sub-vectors is recorded as $k_i$, which contains the corresponding fringe order of each wrapped phase $[k_1, k_2, \ldots, k_n]^T$, for each fringe order vector $k_i$. The corresponding absolute phase $\Phi_i$ is calculated by the following formula:

$$\Phi_i = \varphi + 2\pi k_i \quad (8),$$

where $\Phi_i$ is the absolute phase vector, $\varphi$ is the wrapped phase vector, $k_i$ is the fringe-level sub-vector, and then the projection point vector of the absolute phase is calculated by equations (9) and (10):

$$t = \left(\|\lambda^{-1}\|^2\right)^{-1}(\lambda^{-1})^T \Phi_i = \left[\sum_{j=1}^{n}\left(\frac{1}{\lambda_j^2}\right)\right]^{-1} \sum_{j=1}^{n} \frac{\Phi_j}{\lambda_i}, \quad (9)$$

and $$P_i = t\lambda_i^{-1}, \quad (10)$$

where $\lambda_i$ is the wavelength vector, $\Phi_i$ is the absolute phase vector, n is the number of projected sinusoidal fringes, $P_i$ is the projection point vector, and finally the distance $d_i^2$ between the two is obtained by the formula $$d_i^2 = \|P_i - \Phi_i\|^2 = (P_i - \Phi_i)^T(P_i - \Phi_i) \quad (11).$$

The process further includes selecting the fringe-order sub-vector corresponding to the minimum distance $d_{min}^2$ as the optimal solution, and then the absolute phase $\Phi$ corresponding to the optimal solution is obtained as the initial absolute phase.

The measurement range of the measurement subsystem is definitely limited, and the range of fringe order combination is further narrowed down. That is, the process includes firstly estimating the depth range of the measured scene $[z_{min}^w, z_{max}^w]$, where $z_{min}^w$ is the minimum value of the depth of the measurement range in the world coordinate system, and $z_{max}^w$ is the maximum value of the depth of the measurement range in the world coordinate system. The range of the phase distribution is obtained according to the calibration parameters and the method (real-time structured light illumination three-dimensional topography measurement method) mentioned by Liu Kin (Liu K. "Real-time 3-d reconstruction by means of structured light illumination" 2010.), i.e., $[\Phi_{min}, \Phi_{max}]$, $\Phi_{min}$ is the minimum value of the absolute phase, and $\Phi_{max}$ is the maximum value of the absolute phase, so that the range of fringe order is obtained by the following formula:

$$k_{min}(x^c, y^c) = \text{floor}\left[\frac{\Phi_{min}(x^c, y^c)}{2\pi}\right], \quad (12)$$

and $$k_{max}(x^c, y^c) = \text{ceil}\left[\frac{\Phi_{max}(x^c, y^c)}{2\pi}\right], \quad (13)$$

where $k_{min}$ represents the minimum value of fringe order, $k_{max}$ represents the maximum value of fringe order, $(x^c, y^c)$ represents the pixel coordinates of the camera, floor represents the round-down operation, and $\Phi_{min}$ represents the phase minimum, cell represents the rounding up operation, and $\Phi_{max}$ represents the phase maximum. Reducing the range of fringe order can eliminate a part of wrong fringe order combinations so as to reduce the error points and improve the measurement precision.

The fifth step is to correct the initial absolute phase by using reliability guided compensation (RGC) of fringe order error method. Because images captured by the camera may have lower quality (such as small fringe contrast), the influence of the fast motion of a measured object between each frame cannot be ignored and the absolute phase obtained in the fourth step may have the problem of the fringe order error. Reliability guided compensation (RGC) of fringe order error method can further correct the absolute phase in spacial domain, which can correct the above mentioned errors and improve the measurement precision. The two main issues in the reliability guided compensation (RGC) of fringe order error method are which index is to be selected as the reliability parameter (i.e., how to evaluate whether the absolute phase corresponding to a pixel is correct), and how to design a correction path. The minimum projection distance corresponding to each pixel $d_{min}^2$ in the fourth step is used as the basis for evaluating the reliability of an absolute phase (the larger the $d_{min}^2$ is, the lower the absolute phase reliability is). The reliability at the pixel boundary is defined by a sum of the reliability of two adjacent pixels. By comparing the reliability value at the pixel boundary, the path to be processed is determined. That is, the correction is performed from the pixel with a large reliability value, and the reliability value at the intersection of all pixels is stored in a queue, and is sorted according to the amount of reliability value (the greater the credibility value is, the first it is processed), thus resulting in a corrected absolute phase.

The specific steps of the above processing include:

(1) calculating the reliability value of each pixel boundary, that is, adding the minimum projection distance $d_{min}^2$, obtained by the previous step corresponding to the two pixels connected at the boundary as the reliability value at the pixel boundary;

(2) sequentially determining adjacent pixels, in which if the absolute value of the phase value difference corresponding to the two adjacent pixels is less than $\pi$, the two adjacent pixels are grouped into one group, and all the pixels are grouped according to this method;

(3) sequentially correct absolute phases according to the order of credibility values at the pixel boundaries, in which the higher the credibility is, the first it is processed; if two connected pixels belong to the same group, no processing is performed; if two connected pixels belong to different groups and the number of pixels of the group with a smaller number of pixels is less than a threshold $T_h$ (the value of $T_h$ is determined according to a specific case, the number of pixels smaller than $T_h$ is considered to be a wrong point, and the number of pixels larger than $T_h$ is a separate object), all phase values in this group with a smaller number of pixel are corrected according to the group with a larger number of pixels and then the two groups are combined (that is, the phase values corresponding to the pixels belonging to the groups having a larger number of pixels and the smaller number of pixels are respectively $\Phi_L$ and $\Phi_S$, and the value of $$\text{Round}\left(\frac{\Phi_L - \Phi_S}{2\pi}\right)$$

multiplied by $2\pi$ is added to the phase value corresponding to all the pixels in the group with a smaller number of pixels, and the two groups are combined, where Round means rounding off); and (4) repeating the step (3) until all pixel boundaries in the queue have been processed. With the above steps, the process of correcting the obtained absolute phase by using the reliability guided compensation (RGC) of fringe order error method can be completed. Thus, the absolute phase error can be corrected, and the measurement precision is further improved.

The sixth step is to perform a three-dimensional reconstruction by using the calibration parameters and the corrected absolute phase, thereby accomplishing the three-dimensional topography measurement. The specific process includes: combining the following formula with the calibration parameters obtained in the first step (i.e., the internal parameters and the external parameters of the camera and the projector) and the corrected absolute phase Φ obtained in the fifth step, such that the final three-dimensional world coordinates are obtained to accomplish the reconstruction:

$$x_p = \frac{\Phi W}{2\pi N_L} \quad (14)$$

$$Z_p = M_Z + \frac{N_Z}{C_Z x_p + 1}$$

$$X_p = E_X Z_p + F_X$$

$$Y_p = E_Y Z_p + F_Y,$$

where $E_X$, $F_X$, $E_Y$, $F_Y$, $M_Z$, $N_Z$, $C_Z$ are intermediate variables, which are obtained by the method in (K. Liu, Y. Wang, et al "Dual-frequency pattern scheme for high-speed 3-D shape measurement." Optics express. 18(5), 5229-5244 (2010)), Φ is the absolute phase, W is the resolution of the projector along the direction of fringe intensity variation, $N_L$ is the corresponding number of fringes, $x_p$ is the projector coordinates, and $X_p$, $Y_p$, $Z_p$ are three-dimensional spacial coordinates of the measured object in a world coordinate system. With the above process, the three-dimensional data of the measured scene at the current moment can be obtained, and then the 2D image sequence is taken as a sliding window according to the above steps to repeatedly process the captured two-dimensional pattern sequences so as to obtain the three-dimensional topography reconstruction results of the super-rapid motion scene for the whole measurement period.

Further, referring to FIG. 1 and FIG. 5, a super-rapid three-dimensional topography measurement system based on an improved Fourier transform contour technique comprises: a measuring subsystem, a Fourier transform contour technique subsystem, a calibration unit, an image projection and acquisition unit, and a three-dimensional reconstruction unit.

The measuring subsystem consists of a projector, a camera and a computer. The Fourier transform contour technique subsystem consists of a background normalized Fourier transform contour technique module, a temporal phase unwrapping with projection distance minimization (PDM) module and a reliability guided compensation (RGC) of fringe order error module. The calibration unit calibrates the measurement subsystem to obtain calibration parameters. In the image projection and acquisition unit, the projector projects n (n≥2) patterns and m (m=n) all-white images cyclically onto the measured scene, wherein the n patterns are binary high-frequency sinusoidal fringes with different wavelengths, the m all-white images are with pixel value of 1 and are projected between every two binary high-frequency sinusoidal fringes, and m+n images are captured synchronously by the camera. The background normalized Fourier transform contour technique module processes the captured n+m images to get wrapped phases, and then an initial absolute phase is obtained through the temporal phase unwrapping with projection distance minimization (PDM) module. Then the reliability guided compensation (RGC) of fringe order error module is used to correct the initial absolute phase. The three-dimensional reconstruction unit is then used to reconstruct a three-dimensional topography of the measured scene with the corrected absolute phase and the calibration parameters, so as to obtain three-dimensional spacial coordinates of the measured scene in a world coordinate system, thereby accomplishing three-dimensional topography measurement of the object.

The specific implementations of the image projecting and acquiring unit, the three-dimensional reconstruction unit, the background normalized Fourier transform contour technique module, the temporal phase unwrapping with projection distance minimization (PDM) module and the reliability guided compensation (RGC) of fringe order error module are explained in the above mentioned steps.

Figure 2:
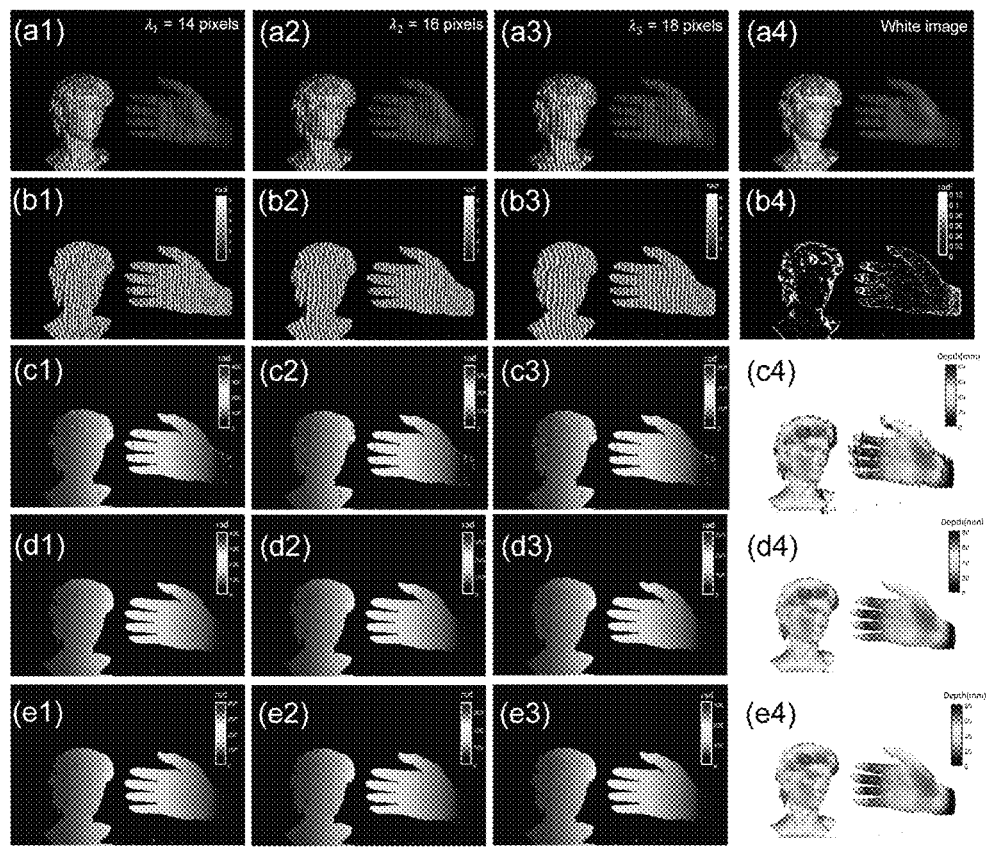
FIG. 2 is the experimental measurement results of a static complex scene, i.e., a plaster image and a hand, of present invention.
Figure 3:
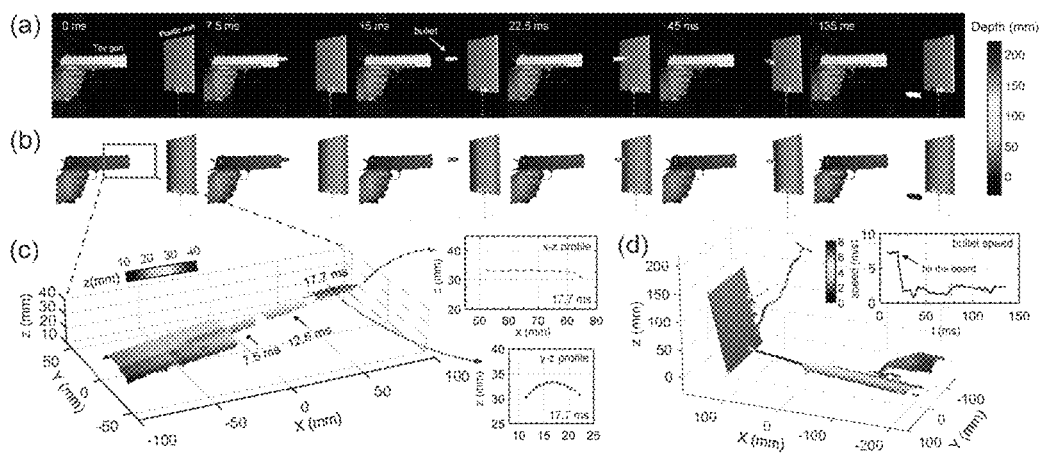
FIG. 3 is the experimental result of three-dimensional topography measurement of the scene in which a bullet rebounds from a toy gun and hits a plastic plate.
Figure 4:
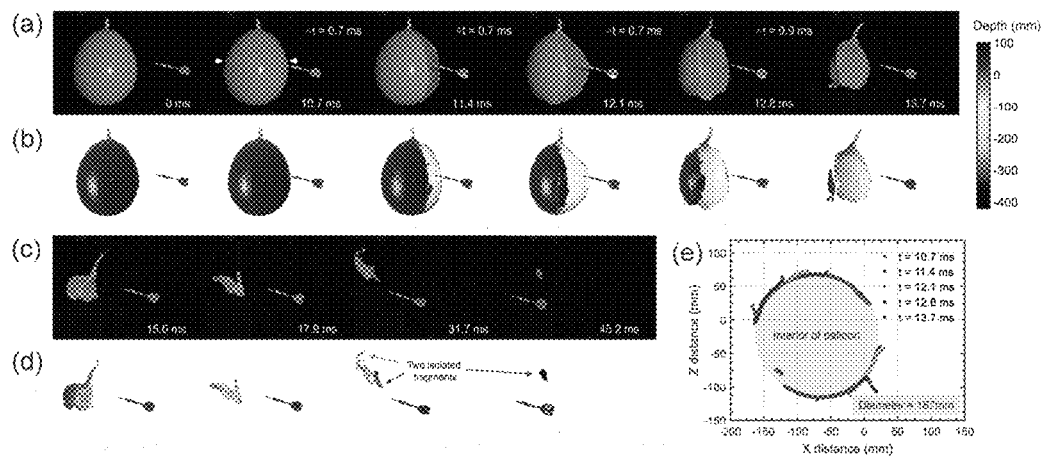
FIG. 4 is the experimental result of three-dimensional topography measurement of a scene in which a dart flies through a balloon and causes the balloon to explode.

The measurement precision and the measurement speed of the super-rapid three-dimensional topography measurement method and system based on an improved Fourier transform contour technique according to the present invention are verified by experiments. In the experiment, a three-dimensional topography measurement system is built by using a projector with a binary pattern projection speed, a camera with an image acquisition speed of 20000 Hz, and a computer. The resolution of the projector is 1024×768. Six binary images are cyclically projected onto the measured scene, three of which are binary high-frequency sinusoidal fringes with wavelengths $\{\lambda_1, \lambda_2, \lambda_3\}=\{14, 16, 18\}$ (in pixels), and three of which are all-white images with the values of 1. The all-white images are projected between binary high-frequency fringes, and images are synchronously acquired using the camera. The experimentally constructed system realized reconstruction rate at 10000 frames per second with absolute three-dimensional topography. Under the measurement range of 400 mm×275 mm×400 mm, the depth precision is 80 μm, and the time domain error is less than 75 μm. The experiments measure a complex set of static scenes, including a plaster statue and a hand, and two sets of high-speed motion scenes, including a scene where the toy gun launches a bullet and the bullet hits a plastic sheet and bounces back, and a scene where a dart flies and hits a balloon and causes the balloon to explode. FIGS. 2-4 illustrate the experimental results in detail.

FIG. 2 is an experimental result of three-dimensional topography measurement of a static scene containing a plaster image and a hand using the super-rapid three-dimensional topography measurement method based on an improved Fourier transform contour technique. Figures (a1)-(a3) are images acquired by the camera when the binary high-frequency sinusoidal fringes are projected onto the measured scene. Figure (a4) are images acquired by the camera when all-white images are projected onto the measured scene. Figures (b1)-(b3) are wrapped phase maps obtained by the background normalized Fourier transform contour. Figure (b4) is the minimum projection distance ($d_{min}^2$) corresponding to each pixel point obtained by the temporal phase unwrapping with projection distance minimization (PDM) method. Figures (c1)-(c3) are initial absolute phase maps obtained by the temporal phase unwrapping with projection distance minimization (PDM) method. Figure (c4) is a three-dimensional topography measurement result reconstructed according to the phase corresponding to Figure (c2). Figures (d1)-(d3) is absolute phase maps after the depth constraint is added to the temporal phase unwrapping with projection distance minimization (PDM) method and limited fringe-level search range. It can be seen that error points are significantly reduced and the measurement precision is improved. Figure (d4) is reconstructed 3D topography measurement results based on the phase corresponding to Figure (d2). Figures (e1)-(e3) are absolute phase maps corrected by the reliability guided compensation (RGC) of fringe order error method for the initial absolute phase. It can be seen that the error points are further reduced, and the measurement precision is improved again. Figure (e4) is a reconstructed 3D topography measurement result based on the phase corresponding to Figure (e2). It can be seen that the three-dimensional topographical measurements obtained after these steps have almost no errors. It fully demonstrates that the super-rapid three-dimensional topography measurement method based on the improved Fourier transform contour technique according to the present invention has high measurement precision.

FIG. 3 is a result of three-dimensional topography measurement using the super-rapid three-dimensional topography measurement method based on the improved Fourier transform contour technique on a scene in which a toy gun launches a bullet and the bullet hits a plastic plate and bounces. Figure (a) are images acquired by cameras corresponding to different time points. Figure (b) are three-dimensional topography measurement results corresponding to the two-dimensional images in Figure (a). Figure (c) are three-dimensional topography measurement results when the bullet is just out of the muzzle (corresponding to the block area in Figure (b)) and the three-dimensional topography measurements corresponding to the bullet at three time points (7.5 ms, 12.6 ms, 17.7 ms). The illustration in Figure (c) shows the contour technique of the bullet corresponding to the time point of 17.7 ms from different sides. Figure (d) is a 3D topography measurement result corresponding to the last moment (135 ms), the curve in the figure shows the movement trajectory of the bullet in the time point of 135 ms, and the illustration in Figure (d) is a curve graphic of bullet velocity versus time.

The experimental results fully demonstrate that the super-rapid three-dimensional topography measurement method based on the improved Fourier transform contour technique can accurately retrieve the three-dimensional topography of the whole process of launching the toy gun and hitting a plastic plate, which proves high speed and precision of the three-dimensional topography measurement method according to the present invention.

FIG. 4 is a result of three-dimensional topography measurement of a scene in which a dart flies and hits a balloon to cause a balloon explosion, using the super-rapid three-dimensional topography measurement method based on the improved Fourier transform contour technique. Figure (a) are the images acquired by cameras corresponding to different time points. Figure (b) are three-dimensional topography measurement results corresponding to the two-dimensional images in Figure (a). Figures (c) and (d) are respectively follow-up of Figure (a) and Figure (b). Figure (e) is a three-dimensional topographic reconstruction contour technique corresponding to the dotted line on the balloon identified in Figure (a) corresponding to the time points of 10.7 ms, 11.4 ms, 12.1 ms, 12.8 ms, and 13.7 ms.

The experimental results fully demonstrate that the super-rapid three-dimensional topography measurement method based on the improved Fourier transform contour technique can accurately retrieve the three-dimensional topography of the whole process of the balloon explosion caused by the dart flying to hit the balloon, which proves the three-dimensional shape measurement method has high speed and precision.

The invention claimed is:

1. A three-dimensional topography measurement method based on an improved Fourier transform contour technique, the method comprising the steps of:
firstly calibrating a measurement system to obtain calibration parameters, the measurement system being composed of a projector, a camera and a computer;
cyclically projecting n (n≥2) patterns and m (m=n) all-white images into a measured scene using the projector, wherein the n patterns are binary sinusoidal fringes with different high frequency fringes, and the m all-white images are with values of 1;
projecting the m all-white images between every two binary high-frequency sinusoidal fringes and synchronously acquiring n+m images using the camera;
using a background normalized Fourier transform contour method to obtain a wrapped phase;
using temporal phase unwrapping with projection distance minimization (PDM) method to obtain initial absolute phases;
using a reliability guided compensation (RGC) of fringe order error method to correct the initial absolute phase; and
finally reconstructing a three-dimensional topography of the measured scene with the corrected absolute phases and the calibration parameters to obtain 3D spatial coordinates of the measured scene in a world coordinate system, thereby accomplishing three-dimensional topography measurement of an object.

2. The method according to claim 1, wherein the step of projecting and synchronously acquiring comprises:
emitting n high-frequency sinusoidal fringe by the projector, said n high-frequency sinusoidal fringe being different in wavelength and the wavelength being marked as $\{\lambda_1, \lambda_2, \ldots, \lambda_n\}$;
designing the wavelength to meet two conditions including a first condition that the wavelength of the sinusoidal fringe is small enough to ensure the phase can be successfully retrieved by traditional Fourier transform contour technique; and a second condition that a least common multiple of the wavelength is greater than or equal to a resolution of the projector along a sinusoidal intensity value, denoted as W, wherein the following formula is satisfied:

$$\text{LCM}(\lambda_1, \lambda_2, \ldots, \lambda_n) \geq W \quad (1),$$

where LCM represents the least common multiple operation and generated high-frequency sinusoidal fringes are represented by the following formula in the projector space:

$$I^p(x^p, y^p) = a^p + b^p \cos(2\pi f_0^p x^p) \quad (2),$$

where superscript p represents the projector space, and $I^p$ represents an intensity of fringes, $(x^p, y^p)$ is pixel coordinates of the projector, $a^p$ is an average intensity of the sinusoidal fringes, $b^p$ is an amplitude of the sinusoidal fringes and $f_0^p$ is a frequency of the sinusoidal fringes;
using the halftone technique to convert the high-frequency sinusoidal fringes into binary high-frequency sinusoidal fringes, so that a projection speed of the projector can reach a maximum of an inherent projection speed of the projector, ensuring that hardware does not affect a measurement speed,
wherein when the fringe pattern is a binary pattern, both $a^p$ and $b^p$ in the equation (2) are ½, and the equation (2) is written as:

$$I_1^p(x^p, y^p) = \frac{1}{2} + \frac{1}{2}\cos(2\pi f_0^p x^p) \quad (3),$$

where $I_1^p$ represents an intensity of a first high-frequency sinusoidal fringe pattern, the all-white images projected between every two binary high-frequency sinusoidal fringes mean that the values of all the pixels on the projected image are "1", that is, all micro-mirrors on the digital micro-mirror device (DMD) as a key component of digital light processing (DLP) projection system, are an "on" state and are represented by the following formula:

$$I_2^p(x^p, y^p) = 1 \quad (4),$$

where $I_2^p$ represents an intensity of the all-white images, $(x^p, y^p)$ represents the pixel coordinates of the projector,
- wherein an expression of the remaining high-frequency sinusoidal fringe is the same as the formula (3), except that the frequency $f_0^p$ is different according to the different wavelength, and
- wherein the n+m images are cyclically projected into the measured scene using the projector, and the camera synchronously acquires the n+m image using a trigger signal of the projector.

3. The method according to claim 1, wherein the wrapped phase is obtained by using a background normalized Fourier transform contour technique method, and a process of obtaining the wrapped phase comprises the steps of:
- after the acquisition of the n+m images by the camera, every two images are sequentially processed, wherein the every two images includes a high-frequency sinusoidal fringe image and a corresponding all-white image and the high-frequency sinusoidal fringe image and the corresponding all-white image captured by the camera are respectively expressed by the following formulas:

$$I_1(x^c, y^c) = \frac{1}{2}\alpha(x^c, y^c) + \frac{1}{2}\alpha(x^c, y^c)\cos[2\pi f_0 x^c + \phi(x^c, y^c)] \quad (5), \text{ and}$$

$$I_2(x^c, y^c) = \alpha(x^c, y^c) \quad (6),$$

where superscript c represents a camera space, $I_1$ is an image captured by the camera after the high-frequency sinusoidal fringe pattern is projected onto the measured scene, $I_2$ is an image captured by the camera after the all-white image is projected onto the measured scene, $(x^c, y^c)$ is pixel coordinates of the camera, $\alpha(x^c, y^c)$ is a surface reflectivity of the measured object, $f_0$ is a sinusoidal fringe frequency, $\phi(x^c, y^c)$ is the phase containing a depth information of the object, $\frac{1}{2}\alpha(x^c, y^c)$ is a zero-frequency part after performing Fourier transform, wherein by using $I_1$ and $I_2$, an influence of the zero-frequency part and the surface reflectivity $\alpha(x^c, y^c)$ of the object to be measured can be removed before performing the Fourier transform, according to the following equation (7):

$$I_d(x^c, y^c) = \frac{2I_1 - I_2}{I_2 + \gamma} = \cos[2\pi f_0 x^c + \phi(x^c, y^c)], \quad (7)$$

where $\gamma$ is a constant;
- performing the Fourier transform on the $I_d$ after background normalization;
- using a filter to extract a valid information; and
- obtaining the wrapped phase by performing an inverse Fourier transform, such that wrapped phases corresponding to each high-frequency sinusoidal fringe acquired by the camera are obtained and contain the depth information of the scene corresponding to each moment when the camera captures the high-frequency sinusoidal fringe pattern.

4. The method according to claim 1, wherein the initial absolute phase is obtained by using a temporal phase unwrapping with projection distance minimization (PDM) method, and a process of obtaining the initial absolute phase comprises the steps of:
- using the wrapped phases corresponding to a set of high-frequency sinusoidal fringes to unwrap each of wrapped phases, wherein the high-frequency sinusoidal fringes projected by the projector are different in wavelength, and are recorded as a wavelength vector $\lambda = [\lambda_1, \lambda_2, \ldots, \lambda_n]^T$, wrapped phase vector corresponding to each high-frequency sinusoidal fringe obtained by Fourier transform contour technique method is marked as $\varphi = [\phi_1, \phi_2, \ldots, \phi_n]^T$, fringe order combinations are listed one by one, each set of fringe-level sub-vectors is recorded as $k_i$, which contains a corresponding fringe order of each wrapped phase $[k_1, k_2, \ldots, k_n]^T$, and for each fringe order vector $k_i$, a corresponding absolute phase $\Phi_i$ is calculated by the following formula:

$$\Phi_i = \varphi + 2\pi k_i \quad (8),$$

where $\Phi_i$ is an absolute phase vector, $\varphi$ is the wrapped phase vector, $k_i$ is the fringe order sub-vector;
- calculating a projection point vector of the absolute phase by equations (9) and (10):

$$t = (\|\lambda^{-1}\|^2)^{-1}(\lambda^{-1})^T \Phi_i = \left(\sum_{j=1}^{n}\left(\frac{1}{\lambda_j^2}\right)\right)^{-1} \sum_{j=1}^{n} \frac{\Phi_j}{\lambda_j}, \quad (9)$$

and $$P_i = t\lambda_i^{-1}, \quad (10)$$

where $\lambda_i$ is the wavelength vector, $\Phi_i$ is the absolute phase vector, n is number of projected sinusoidal fringes, $P_i$ is the projection point vector;
- obtaining a distance $d_i^2$ between $\Phi_i$ and $P_i$ by the formula (11):

$$d_i^2 = \|P_i - \Phi_i\|^2 = (P_i - \Phi_i)^T(P_i - \Phi_i) \quad (11);$$

- selecting a fringe-order sub-vector corresponding to a minimum distance $d_{min}^2$ as an optimal solution; and
- obtaining the absolute phase $\Phi$ corresponding to the optimal solution as the initial absolute phase.

5. The method according to claim 4, wherein a range of enumerated fringe-level sub-combinations is further reduced by depth constraint, comprising the steps of:
- firstly estimating a depth range of a measured scene $[z_{min}^w, z_{max}^w]$, wherein $z_{min}^w$ is a minimum value of a depth of a measurement range in the world coordinate system, $z_{max}^w$ is a maximum value of the depth of the measurement range in the world coordinate system;
- obtaining a range of a phase distribution according to the calibration parameters and a depth constraint method $[\Phi_{min}, \Phi_{max}]$, wherein $\Phi_{min}$ is a minimum value of the absolute phase and $\Phi_{max}$ is a maximum value of the absolute phase; and
- obtaining a range of fringe order by the following formula:

$$k_{min}(x^c, y^c) = \text{floor}\left[\frac{\Phi_{min}(x^c, y^c)}{2\pi}\right], \quad (12)$$

and $$k_{max}(x^c, y^c) = \text{ceil}\left[\frac{\Phi_{max}(x^c, y^c)}{2\pi}\right], \quad (13)$$

where $k_{min}$ represents a minimum value of fringe order, $k_{max}$ represents a maximum value of fringe order, $(x^c, y^c)$ represents pixel coordinates of the camera, floor represents a round-down operation, $\Phi_{min}$ represents minimum value of the phase, ceil represents a rounding up operation, and $\Phi_{max}$ represents maximum value of the phase.

6. The method according to claim 1, wherein the initial absolute phase is corrected by using a reliability guided compensation (RGC) of fringe order error method, and a process of correcting the initial absolute phase comprises the steps of:
  using a minimum projection distance corresponding to each pixel $d_{min}^2$ as a basis for evaluating reliability of the absolute phase;
  defining the reliability at a pixel boundary by a sum of the reliability of adjacent two pixels; and
  determining a path to be processed by comparing the reliability value at the pixel boundary,
  wherein a correction is performed from a pixel with a larger reliability value after the step of comparing, and the reliability value at an intersection of all pixels is stored in a queue, and is sorted according to an amount of credibility value, and
  wherein the greater the credibility value is, the first it is processed, thus resulting in a corrected absolute phase.

7. The method according to claim 6, wherein the RGC of fringe order error method comprises the steps of:
  (1) calculating the credibility value of each pixel boundary, wherein the minimum projection distance $d_{min}^2$ obtained by temporal phase unwrapping with projection distance minimization (PDM) method corresponding to the adjacent two pixels connected at the boundary are added as the credibility value at the pixel boundary;
  (2) sequentially determining adjacent pixels, wherein when a absolute difference of the phase value corresponding to the adjacent pixels is less than π, the two pixels are grouped into one group, and all the pixels are grouped according to this method;
  (3) sequentially correcting absolute phases according to the order of credibility values at the pixel boundaries, wherein the higher the credibility is, the first it is processed,
  wherein when two connected pixels belong to the same group, no processing is performed,
  wherein when two connected pixels belong to different groups and a number of pixels of the group with a small number of pixels is less than a threshold $T_h$, all phase values in a smaller group are corrected according to a group with a larger number of pixels and two groups are combined, wherein phase values corresponding to the pixels belonging to the groups having a larger number of pixels and the smaller number of pixels are respectively $\Phi_L$ and $\Phi_S$, and a value of $$\text{Round}\left(\frac{\Phi_L - \Phi_S}{2\pi}\right)$$

multiplied by 2π is added to the phase value $\Phi_S$ corresponding to all the pixels in the group having a smaller number of pixels, and the two groups are combined where Round means rounding off; and
  (4) repeating the step (3) until all pixel boundaries in the queue have been processed.

8. The method according to claim 1, wherein the step of reconstructing the three-dimensional topography comprises the step of:
  combining the following formula with the calibration parameters and the corrected absolute phase Φ, and obtaining final three-dimensional world coordinates so as to complete the reconstruction:

$$x_p = \frac{\Phi W}{2\pi N_L} \tag{14}$$

$$Z_p = M_Z + \frac{N_Z}{C_Z x_p + 1}$$

$$X_p = E_X Z_p + F_X$$

$$Y_p = E_Y Z_p + F_Y,$$

where $E_X$, $F_X$, $E_Y$, $F_Y$, $M_Z$, $N_Z$, $C_Z$ are intermediate variables, and Φ is the absolute phase, W is a resolution of the projector along a direction of fringe intensity variation, $N_L$ is a corresponding number of fringes, $x_p$, is a projector coordinates, and $X_p$, $Y_p$, $Z_p$ are three-dimensional spatial coordinates of the measured object in the world coordinate system;
  obtaining three-dimensional data of the measured scene at a current moment; and
  repeatedly processing collected two-dimensional pattern sequences so as to obtain a three-dimensional topography reconstruction result of the scene for a whole measurement period.

9. A super-rapid three-dimensional topography measurement system based on an improved Fourier transform contour technique, the system comprising:
  a measuring subsystem, the measuring system comprising a projector, a camera and a computer;
  a Fourier transform contour technique subsystem; and
  the computer being programmed to function as a calibration unit, a projection and acquisition image unit, and a three-dimensional reconstruction unit,
  wherein:
  the Fourier transform contour technique subsystem consists of a background normalized Fourier transform contour technique module, a temporal phase unwrapping technique with a projection distance minimization (PDM) module and a reliability guided compensation (RGC) of fringe order error module,
  the calibration unit is configured to calibrate the measurement subsystem so as to obtain calibration parameters,
  in the projection and acquisition image unit, the projector projects n patterns and m (m=n) all-white images cyclically to a measured scene, n≥2, wherein then patterns are binary high-frequency sinusoidal fringes with different wavelengths, and the m all-white images are with pixel value of 1, and projected between every two binary high-frequency sinusoidal fringes, and the n+m images are collected synchronously by the camera,
  the background normalized Fourier transform contour technique module is configured to process the collected n+m images so as to get wrapped phases, the temporal phase unwrapping with the PDM module is configured to obtain a preliminary absolute phase, and the RGC of fringe order error module is configured to correct an initial absolute phase, and
  the three-dimensional reconstruction unit is configured to reconstruct a three-dimensional topography of the measured scene with a corrected absolute phase and the calibration parameters to obtain three-dimensional spacial coordinates of the measured scene in a world coordinate system, thereby accomplishing three-dimensional topography measurement of an object.

10. The system according to claim 9, wherein the background normalized Fourier transform contour technique module, after acquiring images collected by the camera, is further configured to sequentially process every two images including a high-frequency sinusoidal fringe and a corresponding all-white image wherein the high-frequency sinusoidal fringe image and the all-white image captured by the camera are respectively expressed by the following formulas:

$$I_1(x^c, y^c) = \tfrac{1}{2}\alpha(x^c, y^c) + \tfrac{1}{2}\alpha(x^c, y^c)\cos[2\pi f_0 x^c + \phi(x^c, y^c)] \quad (5), \text{ and}$$

$$I_2(x^c, y^c) = \alpha(x^c, y^c) \quad (6),$$

where superscript c represents a camera space, $I_1$ is an image captured by the camera after the high-frequency sinusoidal fringe pattern is projected onto the measured scene, $I_2$ is an image captured by the camera after the all-white image is projected onto the measured scene, $(x^c, y^c)$ is pixel coordinates of the camera, $\alpha(x^c, y^c)$ is a surface reflectivity of the measured object, $f_0$ is the sinusoidal fringe frequency, $\phi(x^c, y^c)$ is the phase containing a depth information of the object, $\tfrac{1}{2}\alpha(x^c, y^c)$ is a zero-frequency part after performing Fourier transform, wherein by using $I_1$ and $I_2$, an influence of the zero-frequency part and the surface reflectivity $\alpha(x^c, y^c)$ of the object to be measured can be removed before performing the Fourier transform, according to the following equation (7):

$$I_d(x^c, y^c) = \frac{2I_1 - I_2}{I_2 + \gamma} = \cos[2\pi f_0 x^c + \phi(x^c, y^c)], \quad (7)$$

where $\gamma$ is a constant,
- wherein the background normalized Fourier transform contour technique module is further configured to carry out Fourier transform on the $I_d$ after background normalization,
- wherein the system further comprises a filter used to extract a valid information, and is further configured to use an inverse Fourier transform to obtain the wrapped phase such that the wrapped phase corresponding to each high-frequency sinusoidal fringe acquired by the camera is obtained and contains the depth information of the scene corresponding to each moment when the camera captures the high-frequency sinusoidal fringe pattern;
- wherein the temporal phase unwrapping technique with the projection distance minimization (PDM) module is further configured to use the wrapped phases corresponding to a set of sinusoidal fringes to unwrap each of wrapped phases, wherein the high-frequency sinusoidal fringes projected by the projector are different in wavelength, and are recorded as a wavelength vector $\lambda = [\lambda_1, \lambda_2, \ldots, \lambda_n]^T$, a wrapped phase vector corresponding to each high-frequency sinusoidal fringe obtained by Fourier transform contour technique is marked as $\varphi = [\phi_1, \phi_2, \ldots, \phi_n]^T$, fringe order sub-combinations are listed one by one, each set of fringe order sub-vectors is recorded as $k_i$ which contains a corresponding fringe order of each wrapped phase $[k_1, k_2, \ldots, k_n]^T$, and for each fringe order vector $k_i$, a corresponding absolute phase $\Phi_i$ is calculated by the following formula:

$$\Phi_i = \varphi + 2\pi k_i \quad (8),$$

where $\Phi_i$ is an absolute phase vector, $\varphi$ is the wrapped phase vector, $k_i$ is the fringe order sub-vector, and then a projection point vector of the absolute phase is calculated by equations (9) and (10):

$$t = (\|\lambda^{-1}\|^2)^1 (\lambda^{-1})^T \Phi_i = \left(\sum_{j=1}^{n}\left(\frac{1}{\lambda_j^2}\right)\right)^{-1} \sum_{j=1}^{n} \frac{\Phi_j}{\lambda_i}, \quad (9)$$

and $$P_i = t\lambda_i^{-1}, \quad (10)$$

where $\lambda_i$ is the wavelength vector, $\Phi_i$ is the absolute phase vector, n is number of projected sinusoidal fringes, $P_i$ is the projection point vector, and finally a distance $d_i^2$ between $\Phi_i$ and $P_i$ is obtained by the formula $$d_i^2 = \|P_i - \Phi_i\|^2 = (P_i - \Phi_i)^T (P_i - \Phi_i) \quad (11),$$

- wherein the system is further configured to select a fringe-order sub-vector corresponding to a minimum distance $d_{min}^2$ as an optimal solution, and then the absolute phase $\Phi$ corresponding to the optimal solution is obtained as the initial absolute phase, and
- wherein the reliability guided compensation (RGC) of fringe order error module is further configured to:
  - use a minimum projection distance $d_{min}^2$ corresponding to each pixel as a basis for evaluating reliability of absolute phase, wherein the reliability at a pixel boundary is defined by a sum of the credibility of adjacent two pixels; and
  - compare a reliability value at the pixel boundary, and determine a path to be processed, wherein a correction is performed from a pixel with a larger reliability value the reliability value at a intersection of all pixels is stored in a queue and sorted according to an amount of credibility value, and the greater the credibility value is, the first it is processed, thus resulting in a corrected absolute phase.

* * * * *